US008345283B2

(12) United States Patent
Ohara

(10) Patent No.: US 8,345,283 B2
(45) Date of Patent: Jan. 1, 2013

(54) COMMUNICATION SYSTEM AND COMMUNICATION DEVICE

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1121 days.

(21) Appl. No.: 12/186,907

(22) Filed: Aug. 6, 2008

(65) Prior Publication Data
US 2009/0040551 A1 Feb. 12, 2009

(30) Foreign Application Priority Data
Aug. 6, 2007 (JP) ................................. 2007-203858

(51) Int. Cl.
G06F 3/12 (2006.01)
G06F 3/00 (2006.01)
(52) U.S. Cl. ........................................ 358/1.15; 709/19
(58) Field of Classification Search .................... 709/19; 710/19
See application file for complete search history.

(56) References Cited

U.S. PATENT DOCUMENTS

| 5,706,210 A * | 1/1998 | Kumano et al. ............... 709/224 |
| 6,196,735 B1 * | 3/2001 | Inamine ........................... 400/76 |
| 2008/0109568 A1 * | 5/2008 | Rengarajan et al. ............ 710/19 |

FOREIGN PATENT DOCUMENTS

| JP | 10-229589 A | 8/1998 |
| JP | 2002-024035 | 1/2002 |
| JP | 2006-087058 | 3/2006 |
| JP | 2006-235755 | 9/2006 |
| JP | 2006-260187 A | 9/2006 |

OTHER PUBLICATIONS

JP Office Action dtd Nov. 1, 2011, JP Appln. 2007-203858, English translation.

* cited by examiner

Primary Examiner — King Poon
Assistant Examiner — Vincent Peren
(74) Attorney, Agent, or Firm — Banner & Witcoff, Ltd.

(57) ABSTRACT

A communication system may be provided with a first communication device and a second communication device. The first communication device may send the identification information stored in a first storage device to the second communication device. The first communication device may output status information included in combination information sent from the first communication device, and update the stored contents of the first storage device such that identification information included in the combination information is stored in the first storage device. The second communication device may obtain status information concerning a status of the second communication device, and update the stored contents of a second storage device such that the latest combination data including the latest status information and new identification information is stored in the second storage device. The second communication device may send the latest combination information to the first communication device in a case where the received identification information is not identical to the identification information included in the latest combination information, and prohibit the sending of combination information to the first communication device in a case where the received identification information is identical to the identification information included in the latest combination information.

15 Claims, 8 Drawing Sheets

FIG. 2

Status Memory 38

| Status No. | Status Information |
|---|---|
| 5002 | Ink Status : C90,M90,Y90,K10<br>Cover Status : Cover Close<br>Paper Status : A4<br>Duplex Printing Status : Both Side |
| 5003 | Ink Status : C90,M90,Y90,K0 |
| 5004 | Cover Status : Cover Open |
| 5005 | Ink Status : C90,M90,Y90,K100 |
| 5006 | Cover Status : Cover Close |
| 5007 | Paper Status : A4,Hagaki |

FIG. 3

Status Memory 38

| Status No. | Status Information |
|---|---|
| 5003 | Ink Status: C90,M90,Y90,K0<br>Cover Status: Cover Close<br>Paper Status: A4<br>Duplex Printing Status: Both Side |
| 5004 | Cover Status: Cover Open |
| 5005 | Ink Status: C90,M90,Y90,K100 |
| 5006 | Cover Status: Cover Close |
| 5007 | Paper Status: A4, Hagaki |
| 5008 | Cover Status: Cover Open |
| 5009 | Cover Status: Cover Close |

80 — Status No. column
82 — Status Information column

103 → row 5003
104 → row 5004
105 → row 5005
106 → row 5006
107 → row 5007
108 → row 5008
109 → row 5009

COMMUNICATION SYSTEM AND COMMUNICATION DEVICE

CROSS-REFERENCE TO RELATED APPLICATION

This application claims priority to Japanese Patent Application No. 2007-203858, filed on Aug. 6, 2007, the contents of which are hereby incorporated by reference into the present application.

BACKGROUND OF THE INVENTION

1. Field of the Invention

The present invention relates to a technique for communication of information between at least two communication devices. In particular, the present invention relates to a technique for communication of status information relating to the status of one of the communication devices to the other of the communication devices.

2. Description of the Related Art

A system is set forth in, for example, Japanese Patent Application No. 2006-235755 for status information of a printer (information relating to the remaining amount of consumable supplies) to be communicated from the printer to a terminal device. The terminal device periodically sends a status request command to the printer. Each time the printer receives the status request command, the printer sends its status information to the terminal device.

BRIEF SUMMARY OF THE INVENTION

In the prior art, the printer sends the status information to the terminal device each time the printer receives the status request command. That is, the printer sends the status information in response to the status request command even in the case where the status of the printer has not changed between the last status request command and the present status request command. In this case, the status information that the terminal device has already obtained is sent again from the printer to the terminal device. From the viewpoint of the load on a network between the printer and the terminal device, sending this type of unnecessary information is not desired.

A technique is taught in the present specification that is capable of reducing the occurrence of unnecessary status information being sent.

One technique taught in the present specification is a communication system that comprises a first communication device and a second communication device to be connected with the first communication device in a communicable manner. The term "communication device" is to be interpreted in its broadest sense, and includes all devices capable of performing communication of information. Examples of a communication device may include a personal computer, a server, a printer, a scanner, a multi-function device, a portable terminal, and the like.

The first communication device may comprise a first storage device, a first sending device, a first receiving device, an information outputting device, and a first updating device. The first storage device may be configured to store identification information. "Identification information" may be of any format of information. For example, the identification information may be a number, a letter of the alphabet, or a combination thereof. The first sending device may send the identification information stored in the first storage device to the second communication device. There is no particular restriction on the timing at which the first sending device sends the identification information. For example, the first sending device may send the identification information when a user has performed a predetermined operation. Further, for example, the first sending device may send the identification information periodically. The first receiving device may receive combination information (i.e. information in which status information of the second communication device and identification information have been combined) sent from the second communication device. The information outputting device may output the status information included in the combination information received by the first receiving device. The term "outputs" includes displaying, printing, sending to another device, etc. Further, the term "outputs" includes not only outputting the status information included in the received combination information in an intact format, but also includes outputting information that has been obtained by processing the status information. The first updating device may update the stored contents of the first storage device such that the identification information included in the combination information received by the first receiving device is stored in the first storage device. The term "updates" includes not only deleting the identification information stored in the first storage device and storing new identification information, but also includes cumulatively storing a plurality of items of identification information in the first storage device. In a case where a plurality of items of identification information is stored in the first storage device, the first sending device may send the latest identification information stored in the first storage device to the second communication device.

The second communication device may comprise a status information obtaining device, a second storage device, a second updating device, a second receiving device, a determination device, a second sending device, and a sending controlling device. The status information obtaining device may obtain status information concerning a status of the second communication device. The second storage device may store combination information including status information and identification information. The second updating device may update the stored contents of the second storage device such that the latest combination information including the latest status information obtained by the status information obtaining device and new identification information is stored in the second storage device. The term "updates" includes not only deleting the combination information stored in the second storage device and storing new combination information, but also includes cumulatively storing a plurality of items of combination information in the second storage device. That is, the second storage device may store only the one latest item of combination information, or may cumulatively store a plurality of items of combination information. Further, there is no particular restriction on the time at which the stored contents of the second storage device are updated. For example, the stored contents of the second storage device may be updated periodically. Further, for example, the stored contents of the second storage device may be updated in a case where the status of the second communication device has changed, as will be described later. The second receiving device may receive the identification information sent from the first communication device. The determination device may determine whether the identification information received by the second receiving device is identical to the identification information included in the latest combination information stored in the second storage device. The second sending device may send the latest combination information to the first communication device in a case where the determination device determines that the received identification information is not identical to the identification information included in the latest combination information. The sending controlling device may prohibit the second sending device from sending combination information to the first communication device in a case where the determination device determines that the received identification information is identical to the identification information included in the latest combination information.

In the aforementioned communication system, the second communication device stores the latest combination information that includes the latest status information and the identification information. For example, the second communication device is storing the latest combination information that includes status information "S" and identification information "003". By contrast, the first communication device is storing identification information (for example, "002") that has been received in the past. The first communication device sends the identification information "002" to the second communication device. In this case, it is determined in the second communication device that the received identification information "002" is not identical to the identification information "003" included in the latest combination information. The second communication device therefore sends the latest combination information that includes the status information "S" and the identification information "003" to the first communication device. The first communication device can obtain the latest status information "S", and can output this information. The user can thus learn of the latest status information "S" of the second communication device. Further, in this case, the first communication device stores the identification information "003". If the identification information "003" is sent from the first communication device to the second communication device in a state where the stored contents of the second communication device have not been updated from the state as described above, it is determined in the second communication device that the received identification information "003" is identical to the identification information "003" included in the latest combination information. In this case, the status information "S" and the identification information "003" is prohibited from being sent to the first communication device. As a result, unnecessary status information is not sent from the second communication device to the first communication device. The load on the network can thus be reduced.

Moreover, as described above, the second storage device may store only the one latest item of combination information, or may cumulatively store a plurality of items of combination information. In the latter case, the combination information may be stored as follows. That is, the following may be stored: first combination information (status information "S1" and identification information "001"), newer second combination information (status information "S2" and identification information "002"), and latest third combination information (status information "S1" and identification information "003"). In this case, in a case where the second communication device has received the identification information "002" sent from the first communication device, the second communication device sends the third combination information to the first communication device. By contrast, in a case where the second communication device has received the identification information "001" sent from the first communication device, the second communication device may or may not send the third combination information to the first communication device. This is because the status information "S1" included in the first combination information and the status information "S1" included in the third combination information are identical. In this case, the second communication device (the second sending device) may send only the latest identification information "003" to the first communication device. The second sending device functioning in this manner is also included in the second sending device that sends the combination information.

BRIEF DESCRIPTION OF THE DRAWINGS

FIG. 2 shows an example of stored contents of a status memory.
FIG. 3 shows an example of the stored contents of the status memory.

DETAILED DESCRIPTION OF THE PREFERRED EMBODIMENT

Figure 1:
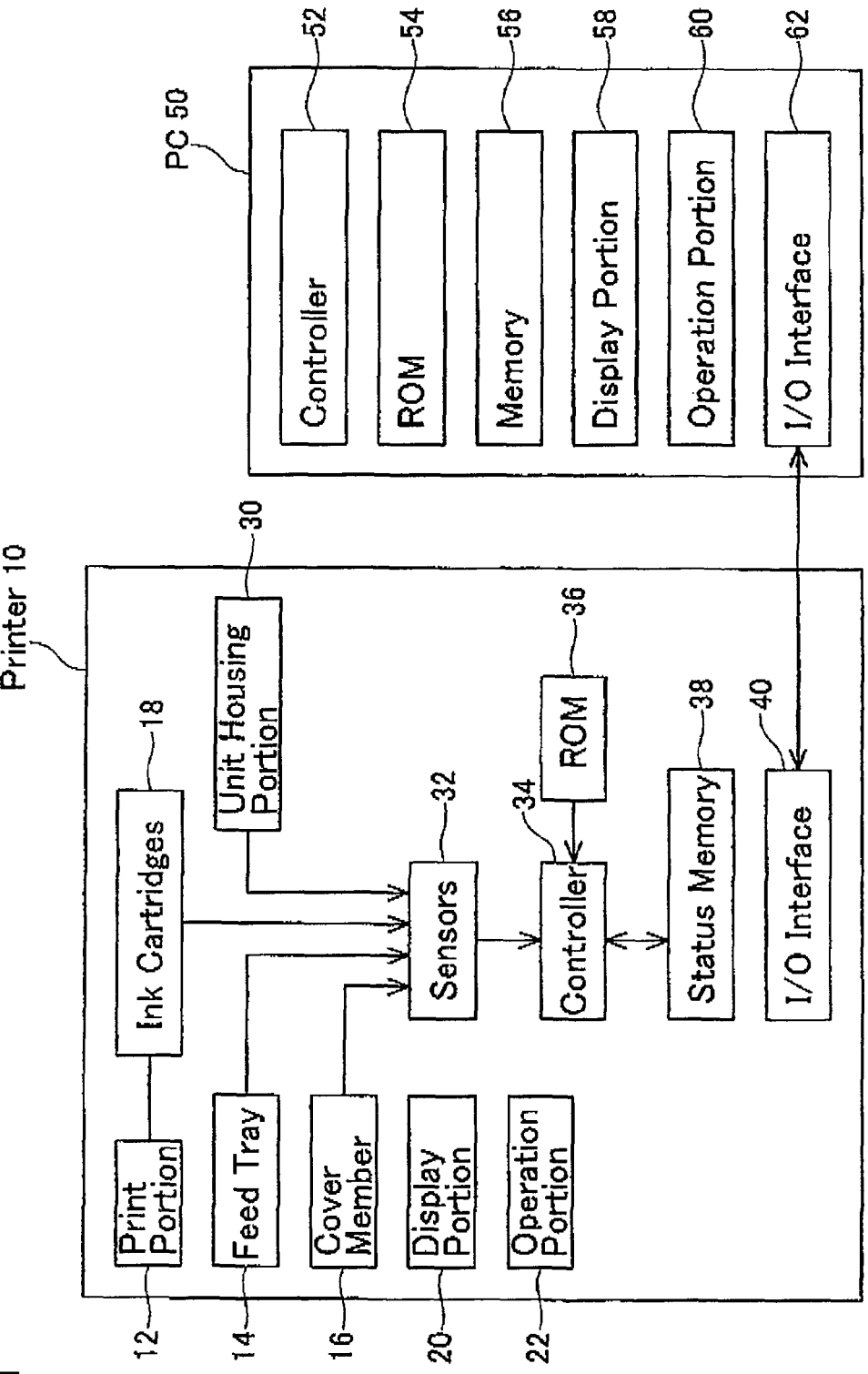
FIG. 1 shows the configuration of a printer system.

An embodiment will be described with reference to the figures. FIG. 1 shows a printer system 2 of the present embodiment The printer system 2 comprises a printer 10 and a PC (personal computer) 50. In FIG. 1, only one PC 50 is shown. However, a plurality of PCs 50 is actually present. The plurality of PCs 50 is connected so as to be capable of communicating with the printer 10.

(Configuration of the Printer)

The printer 10 comprises a print portion 12, a feed tray 14, a cover member 16, ink cartridges 18, a display portion 20, an operation portion 22, a unit housing portion 30, sensors 32, a controller 34, a ROM 36, a status memory 38, an Input/Output interface 40, etc. The print portion 12 is an ink jet type printing device. The print portion 12 utilizes ink housed within the ink cartridges 18 to print printing paper housed in the feed tray 14. The feed tray 14 is capable of simultaneously housing a plurality of types (for example, A4, B5, Hagaki) of printing paper. The cover member 16 opens and closes with respect to a casing (not shown). The ink cartridges 18 can each be changed when the cover member 16 is in an opened state with respect to the casing. Further, maintenance can be performed on devices within the casing when the cover member 16 is in the opened state with respect to the casing. In the present embodiment, printing is performed utilizing four colors of ink: cyan (C), magenta (M), yellow (Y) and black (K). For this reason, there are four ink cartridges 18 that house the different colors of ink.

The display portion 20 is capable of displaying information. The operation portion 22 consists of a plurality of keys. The user can input information and instructions to the printer 10 by operating the operation portion 22. The unit housing portion 30 can removably house a duplex print unit (not shown). The printer 10 can print both sides of the printing paper when the duplex print unit is being housed in the unit housing portion 30. The printer 10 can print only one side of the printing paper when the duplex print unit is not being housed in the unit housing portion 30.

The sensors 32 detect the status of the configurational members. The detected results of the sensors 32 are sent to the controller 34. Specifically, the detected results of each of the sensors 32 are sent to the controller 34 by changing the voltage between the respective sensor 32 and the controller 34 and switching current ON and OFF between the sensor 32 and the controller 34. The specific configuration of the sensors 32 will be described below.

(1) The sensors 32 include an ink remaining amount detecting sensor that detects the amount of ink remaining in the ink cartridges 18. There are four ink cartridges 18 in the present embodiment. For this reason, four ink remaining amount detecting sensors are provided. The ink remaining amount detecting sensors are capable of detecting the amount of remaining ink in 10% units, in an ink cartridge 18 whose remaining amount of ink is 100% in a brand-new state. For example, in a case where a brand-new ink cartridge 18 is present, the ink remaining amount detecting sensor sends detected results showing "100" to the controller 34. Further, in the case also where 0 to 9% of the ink has been consumed from the ink cartridge 18, the ink remaining amount detecting sensor sends detected results showing "100" to the controller 34. In the case where 10 to 19% of the ink has been consumed from the ink cartridge 18, the ink remaining amount detecting sensor sends detected results showing "90" to the controller 34. The controller 34 can thus obtain the status information relating to the amount of ink remaining in the ink cartridges 18 (and this information is hereinafter termed "ink status information").

(2) The sensors 32 include a paper detecting sensor that detects the type (size) of the printing paper housed in the feed tray 14. In a case, for example, where only A4 size printing paper is being housed in the feed tray 14, the paper detecting sensor sends detected results showing "A4" to the controller 34. Meanwhile, in a case, for example, where A4 size and B5 size printing paper are being housed in the feed tray 14, the paper detecting sensor sends detected results showing "A4, B5" to the controller 34. The controller 34 can thus obtain the status information relating to the type of the printing paper being housed in the feed tray 14 (and this information is hereinafter termed "paper status information").

(3) The sensors 32 include a cover detecting sensor that detects whether the cover member 16 is in an opened or a close state. When the cover member 16 is in the open state, the cover detecting sensor sends detected results showing "open" to the controller 34 (for example, it may turn the current ON). Further, when the cover member 16 is in the close state, the cover detecting sensor sends detected results showing "close" to the controller 34 (for example, it may turn the current OFF). The controller 34 can thus obtain the status information relating to the cover member 16 being open or closed (and this information is hereinafter termed "cover status information").

(4) The sensors 32 include a unit detecting sensor that detects whether the duplex print unit is being housed in the unit housing portion 30. When the duplex print unit is being housed in the unit housing portion 30, the unit detecting sensor sends detected results showing "housed state" to the controller 34 (for example, it turns the current ON). Further, when the duplex print unit is not being housed in the unit housing portion 30, the unit detecting sensor sends detected results showing "non-housed state" to the controller 34 (for example, it turns the current OFF). The controller 34 can thus obtain the status information relating to the duplex print unit (and this information is hereinafter termed "duplex printing status information").

The controller 34 executes processes in accordance with programs that are being stored in the ROM 36. The print portion 12 and the display portion 20 are thereby controlled. Further, the controller 34 is capable of updating the stored contents of the status memory 38. The ROM 36 stores the programs that are executed by the controller 34. The status memory 38 is capable of storing the status information of the printer 10. The stored contents of the status memory 38 will be described in detail later. The I/O interface 40 is connected with an I/O interface 62 of the PC 50. The printer 10 can communicate with the PC 50 via the I/O interface 40.

(Stored Contents of the Status Memory)

The stored contents of the status memory 38 will now be described. FIG. 2 shows an example of the stored contents of the status memory 38. The status memory 38 is capable of storing a plurality of items of combination information 102 to 107. In the present embodiment, the status memory 38 is capable of storing at most six items of combination information as 102 to 107. Each of the items of combination information 102 to 107 is an association of a status number 80 and status information 82. Each of the items of combination information 102 to 107 has a different status number 80. In the present embodiment, the greater the status number 80, the newer the information. That is, in FIG. 2 the combination information 102 (status number "5002") is the oldest information, and the combination information 107 (status number "5007") is the newest information.

The status information 82 of the combination information 102 includes the ink status information, the cover status information, the paper status information, and the duplex printing status information. That is, the status information 82 of the combination information 102 includes all of the types of status information that can be detected by the sensors 32. By contrast, the status information 82 of the other items of combination information 103 to 107 each includes only one type of status information. Below, the combination information that includes all of the types of status information (e.g. the combination information 102 in the example shown in FIG. 2) may be termed "all types combination information". Further, the combination information that includes only one type of status information (the combination information 103 to 107 in the example shown in FIG. 2) may be termed "difference combination information".

The ink status information is status information concerning the amount of ink remaining in the ink cartridges 18. For example, the ink status information of the combination information 102 means that cyan ink is 90%, magenta ink is 90%, yellow ink is 90%, and black ink is 10%, The cover status information is status information concerning the cover member 16 being open or closed. For example, the cover status infounation of the combination information 102 means that the cover member 16 is closed. The paper status information is status information concerning the type of printing paper housed in the feed tray 14. For example, the paper status information of the combination information 102 means that A4 size printing paper is being housed in the feed tray 14. The duplex printing status information is status information concerning the duplex print unit. For example, the duplex printing status information of the combination information 102 means that the duplex print unit is housed in the unit housing portion 30, and that duplex printing is possible.

Each time any of the statuses change, the stored contents of the status memory 38 are updated. For example, FIG. 3 shows an example of the stored contents of the status memory 38 after being updated from the state shown in FIG. 2. In the example of FIG. 3, the combination information 102 has been deleted, and the status information 82 of the combination information 103 has been updated. Further, combination information 108 is newly stored. If the status further changes from this state, the combination information 103 will be deleted, and the status information 82 of the combination information 104 will be updated. Further in such case, combination information 109 will be newly stored. The manner in which the stored contents of the status memory 38 are updated will later be described in detail.

(Configuration of the PC)

Figure 4:
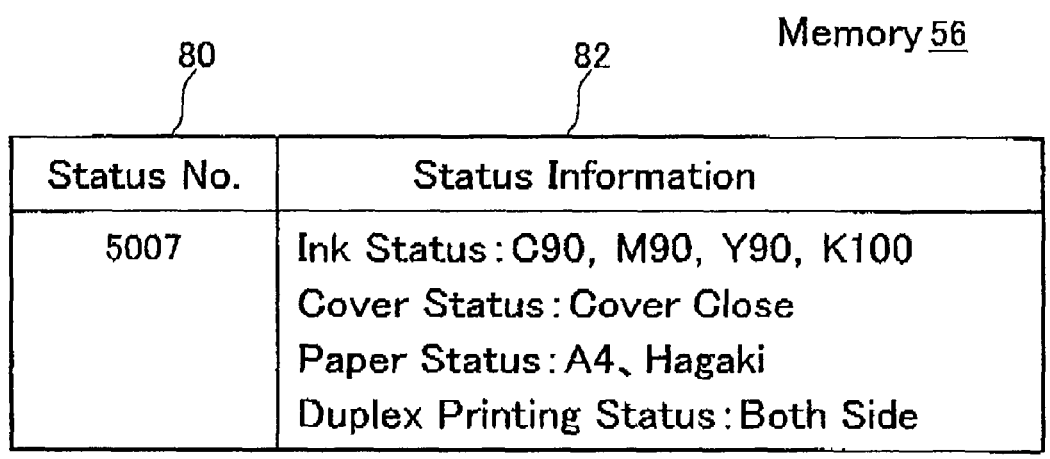
FIG. 4 shows an example of the stored contents of a memory of a PC.

As shown in FIG. 1, the PC 50 comprises a controller 52, a ROM 54, a memory 56, a display portion 58, an operation portion 60, and the I/O interface 62. The controller 52 executes processes in accordance with programs that are being stored in the ROM 54. The display portion 58, etc. are thereby controlled. The ROM 54 stores the programs that are executed by the controller 52. The memory 56 is capable of storing variety of information. For example, the memory 56 is capable of storing various data that are created while the controller 52 is executing processes. Further, the memory 56 of the present embodiment is capable of storing the status number 80 and the status information 82 in an associated manner. FIG. 4 shows an example of the stored contents of the memory 56. The status information 82 stored by the memory 56 includes all types of status information.

The display portion 58 is capable of displaying information. The operation portion 60 consists of a mouse and a keyboard. The user can input information and instructions to the PC 50 by operating the operation portion 60. The I/O interface 62 is connected with the I/O interface 40 of the printer 10. The PC 50 can communicate with the printer 10 via the I/O interface 62.

Figure 5:
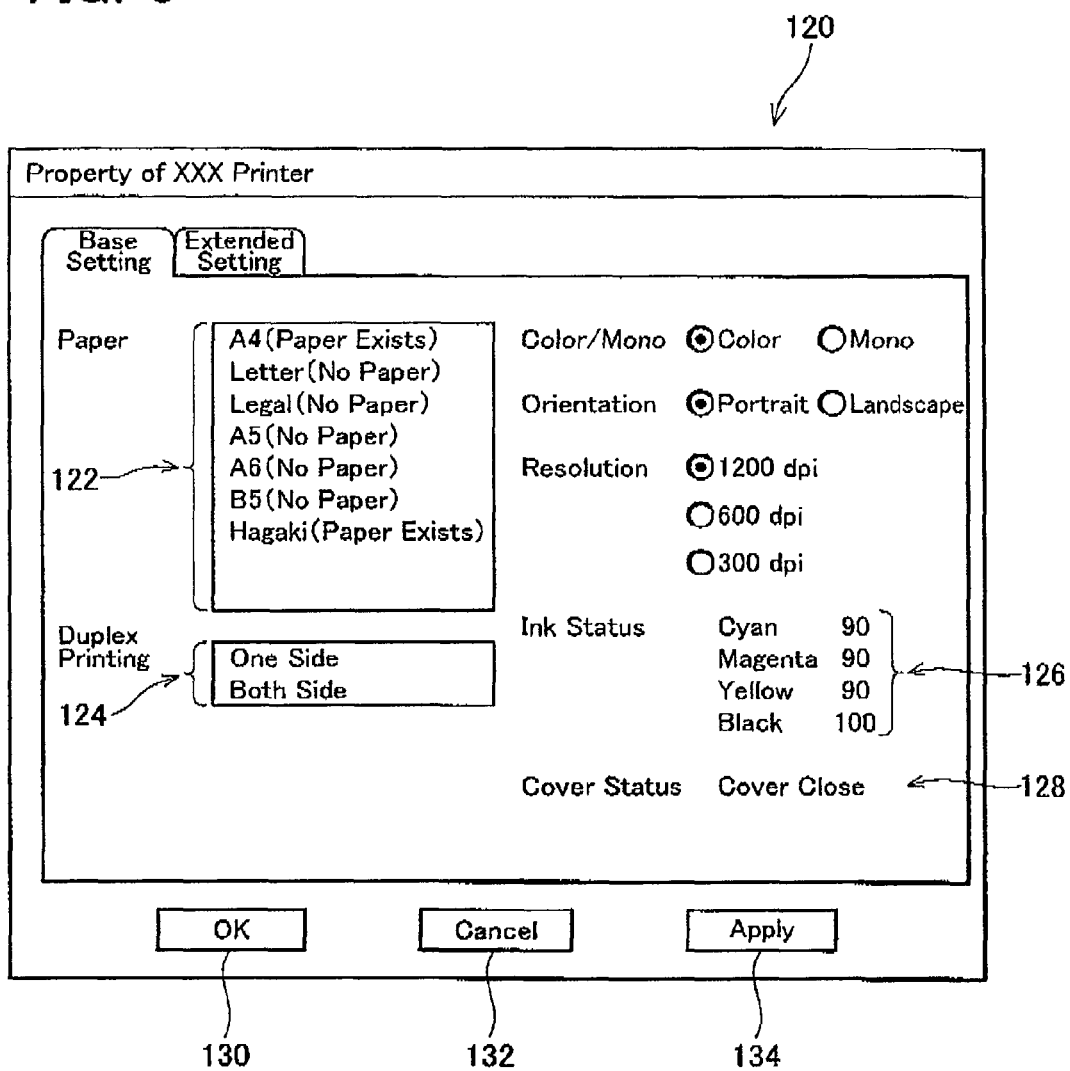
FIG. 5 shows an example of a printer property window.

The user of the PC 50 can instruct the PC 50 to display the property (the status) of the printer 10 by operating the operation portion 60. FIG. 5 shows an example of a window 120 displayed in the display portion 58 in the case where the above instruction has been input. The window 120 has a paper status display area 122, a duplex printing status display area 124, an ink status display area 126, a cover status display area 128, etc. How the window 120 is displayed will later be described in detail.

(Process Executed by the PC)

Figure 6:
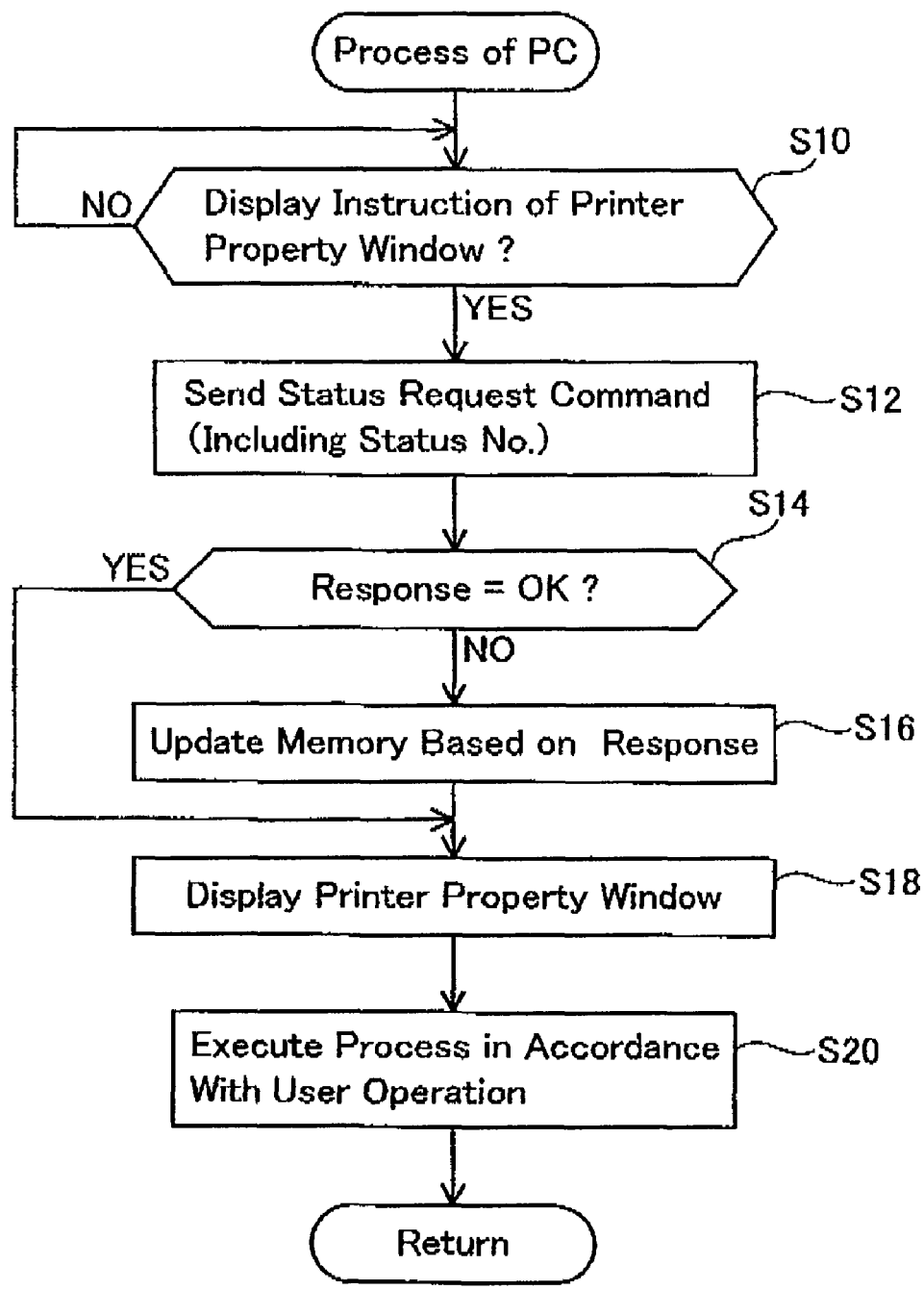
FIG. 6 shows a flow chart of a process executed by the PC.

Next, the contents of a process executed by the PC 50 will be described. This process is executed by the controller 52 of the PC 50. FIG. 6 shows a flowchart of the process executed by the controller 52. Processes not particularly related to the technique taught in the present specification are omitted from this flowchart.

The controller 52 monitors whether the user has instructed the printer property window 120 (see FIG. 5) to be displayed (S10) In the case of YES in S10, the controller 52 sends a status request command to the printer 10 (S12). The status request command includes the status number being stored in the memory 56. For example, in the case where the information shown in FIG. 4 is being stored in the memory 56, a status request command including the status number "5007" is sent to the printer 10 in S12.

Next, the controller 52 monitors a response from the printer 10 (S14). The response from the printer 10 is any one of the three following forms, the detail of which will later be described:

(1) An "OK" response.
(2) A response including only the status number.
(3) A response including the status number and the status information. Note that the status information in this response may include the all types of status information (the ink status information, the cover status information, the paper status information, and the duplex printing status information), or a lesser number of types of status information (any one or more of the three types of status information).

In the case where the "OK" response was received, S14 is determined 'YES'. In this case, S16 is skipped. In the case where the response including only the status number was received, or in the case where the response including the status number and the status information was received, S14 is determined 'NO'. In this case, the controller 52 updates the stored contents of the memory 56 based on the response (S16). For example, in the case where the response including only the status number was received, the controller 52 updates the status number 80 of the memory 56 to the received status number. For example, in the case where a response including only the status number "5009" was received, the controller 52 deletes the status number "5007" of FIG. 4 and stores the status number "5009". Further, in the case for example where the response including the status number and the status information was received, the controller 52 updates the status number 80 of the memory 56 to the received status number, and updates the status information 82 of the memory 56 to the received status information.

As described above, the status information included in the response may include all the types of status information or a lesser number of types of status information. In the former case, the controller 52 deletes all of the types of status information that had been included in the status information 82 of the memory 56, and stores all of the received types of status information in the memory 56. In the latter case, the controller 52 deletes only the type of Status information that is categorized in the same type as the received status information from the status information 82 of the memory 56, and stores the received type of status information in the memory 56. For example, in the case where only the ink status information was received, the controller 52 deletes only the ink status information from the status information 82 of the memory 56, and instead stores the received ink status information in the memory 56.

Next, the controller 52 reads the stored contents of the memory 56. The controller 52 displays the printer property window 120 (see FIG. 5) in the display portion 58 based on the stored contents that were read (S18). The controller 52 creates the display areas 122, 124, 126, and 128 based on the types of status information stored in the memory 56. For example, the controller 52 creates the paper status display area 122 based on the paper status information stored in the memory 56. In the case of the example of FIG. 4, the paper status information stored in the memory 56 is "A4" and "Hagaki". In this case, as shown in FIG. 5, the controller 52 creates the paper status display area 122 displaying that "A4" and "Hagaki" printing paper are present. Because the printer property window 120 is displayed, the user can learn the status of the printer 10. Next, the controller 52 executes a process with respect to the printer property window 120 in accordance with a user operation (S20). For example, the controller 52 executes a process in accordance with a clicking operation being performed on buttons 130, 132, and 134 (see FIG. 5) that are included in the printer property window 120.

(Process Executed by the Printer)

Figure 7:
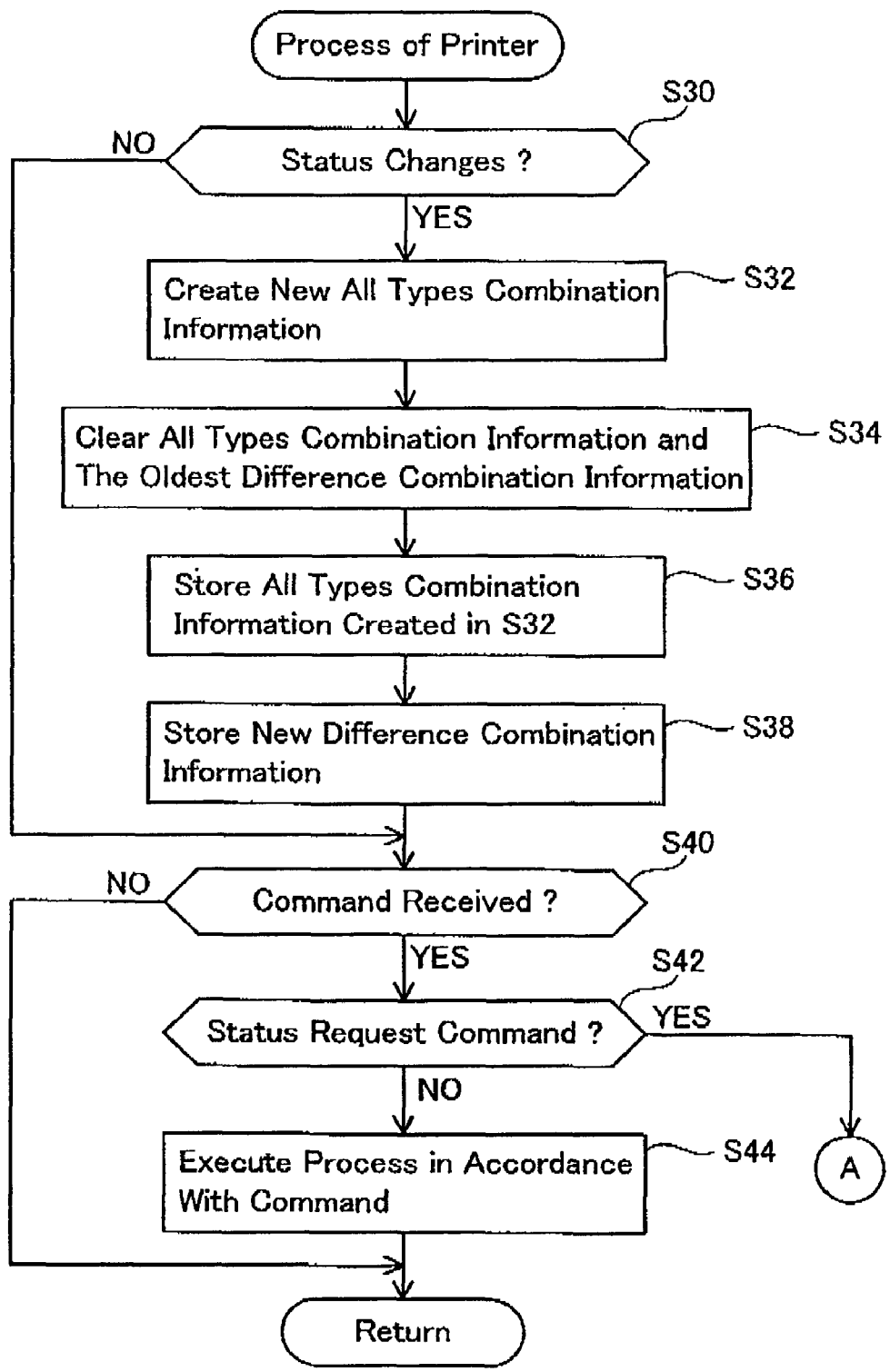
FIG. 7 shows a flow chart of a process executed by a printer.
Figure 8:
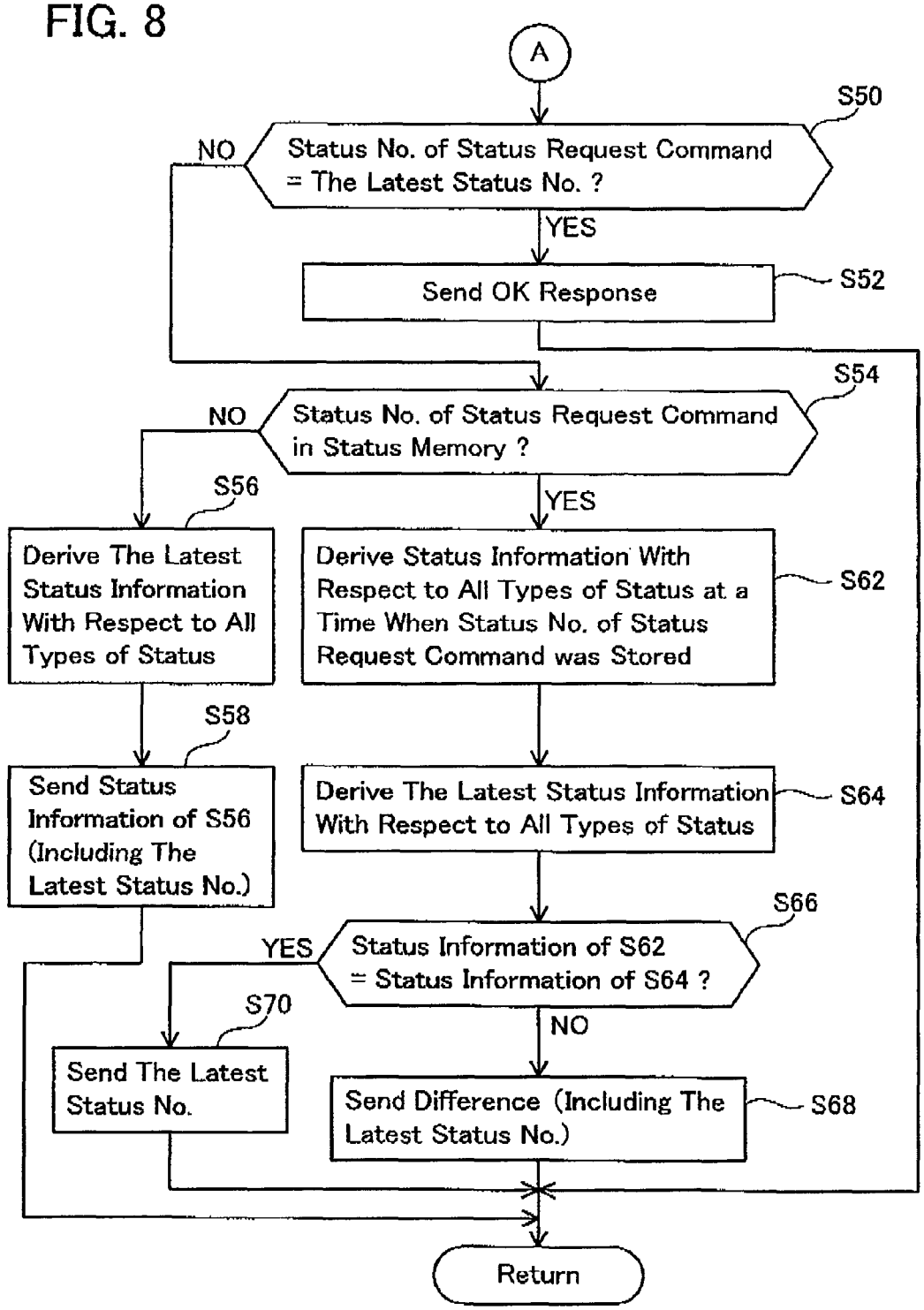
FIG. 8 shows a continuation of the flow chart of FIG. 7.

Next, the contents of a process executed by the printer 10 will be described. This process is executed by the controller 34 of the printer 10. FIG. 7 and FIG. 8 show a flow chart of the process executed by the controller 34. Processes not particularly related to the technique taught in the present specification have been omitted from the flow chart.

The controller 34 monitors whether the status of the printer 10 changed or not (S30). It is determined 'YES' in S30 in the case where there has been a change in the detected results of the sensors 32. For example, 'YES' to S30 is determined in a case where the detected results of the ink remaining amount detecting sensor for black ink have changed from "100" to "90". In the case of YES in S30, the controller 34 creates new all types combination information based on the all types combination information and the oldest difference combination information stored in the status memory 38 (S32). For example, in the case of the example of FIG. 2, the controller 34 creates new all types combination information based on the all types combination information 102 and the oldest difference combination information 103. In this case, the ink status information in the all types combination information 102 (C90, M90, Y90, K10) is changed to the ink status information of the difference combination information 103 (C90, M90, Y90, K0). The other types of status information of the all types combination information 102 (the cover status information, the paper status information, and the duplex printing status information) are not changed. The new status information is thus created. The status number "5003" of the oldest difference combination information 103 is associated with this new status information. The new all types combination information is thus created.

Next, the controller 34 deletes the all types combination information and the oldest difference combination information that has been stored in the status memory 38 (S34). For example, in the case of the example of FIG. 2, the controller 34 deletes the all types combination information 102 and the oldest difference combination information 103. Then the controller 34 stores the new all types combination information created in S32 in the status memory 38 (S36). In the case of the above example, the all types combination information displayed by the reference number 103 in FIG. 3 is stored in the status memory 33.

Next, the controller 34 creates a new item of difference combination information in accordance with the change in stats, and stores the new difference combination information that was created in the status memory 38. A status number that is incremented by one from the status number of the latest difference combination information is applied to this new difference combination information. The status information of the status type after the change is associated with this new status number. The new difference combination information is thus completed. For example, in the case of the example of FIG. 2, the status number of the latest difference combination information 107 is "5007". In this case, the status number "5008" is applied to the new difference combination information. Further, in the case where the cover member 16 is opened in the state shown by the status memory 38 of FIG. 2, the status number "5008" is associated with the cover status information (cover open) showing that the cover member 16 has been opened. The new difference combination information 108 is thus completed. FIG. 3 indicates the new difference combination information 108 that has been stored in the status memory 38 by the series of aforementioned processes.

The controller 34 monitors whether a command has been received from the PC 50 (S40). In a case where any command has been received from the PC 50, S40 is determined 'YES'. In the case where S40 is 'YES', the controller 34 determines whether the received command is a status request command (S42). In a case where 'NO' is determined of S42, the controller 34 executes a process in accordance with the received command (S44). In a case where 'YES' is determined of S42, the process proceeds to S50 of FIG. 8.

In S50, the controller 34 compares the status number included in the status request command and the status number of the latest difference combination information that is stored in the status memory 38. The controller 34 determines whether the status number included in the status request command and the status number of the latest difference combination information are identical. For example, in the case of the state of FIG. 2 stored in the status memory 38, the status number of the latest difference combination information 107 is "5007". In the case where the status number included in the status request command is "5007", 'YES' is determined of S50. In this case, the controller 34 sends the "OK" response to the PC 50 (S52). Here, the status number and the status information are not sent.

In a case where the status number included in the status request command and the status number of the latest difference combination information are not identical, 'NO' is determined of S50. In this case, the controller 34 determines whether the status number included in the status request command is present in the status memory 38 (S54). For example, the status numbers "5002" to "5007" are present in the status memory 38 in the state of FIG. 2. In this state, 'NO' is determined of S54 in the case where the status number included in the status request command is "5001" or less. In such a case, the controller 34 derives the latest status information for an types of status based on the combination information included in the status memory 38 (S56). This process is executed by changing the status information in sequence from the older combination information to the newer combination information. For example, in the case of the example of FIG. 2, the controller 34 creates new status information for all types of status by changing the ink status information that had been included in the status information of the all types combination information 102 to the ink status information of the difference combination information 103. Then, the controller 34 creates new status information for all types of status by changing the cover status information included in the status information for all types of status that had been created to the cover status information of the difference combination information 104. The controller 34 can create the latest status information for all types of status by repeating this process through to the latest difference combination information 107. The controller 34 sends the latest status information for all types of status created in S56 to the PC 50 (S58). Here, the status number of the latest difference combination information ("5007" in the example of FIG. 2) is also sent to the PC 50.

In the case where the status number included in the status request command is present in the status memory 38, 'YES' is determined of S54. For example, the status numbers "5003" to "5008" are present in the status memory 38 in the state of FIG. 3. In this state, 'YES' is determined of S54 in a case where the status number included in the status request command is any out of "5003" to "5007". Moreover, 'YES' is determined of S50 in the case where the status number included in the status request command is "5008", and S54 is not executed. In the case where 'YES' is determined of S54, the controller 34 derives the status information for all types of status at the time when the status number included in the status request command was stored in the status memory 38 (S62). For example, in a case where the status number included in the status request command is "5007" in the conditions where the state of FIG. 3 is present in the status memory 38, the controller 34 derives the status information for all types of status based on the combination information 103 to 107 included in the status memory 38. In the case of this example, the ink status information "C90, M90, Y90, K100", the cover status information "cover close", the paper status information "A4, Hagaki", and the duplex printing status information "both side " is derived.

Next, the controller 34 derives the latest status information for all types of status (S64). For example, in the case where the state of FIG. 3 is being stored in the status memory 38, the controller 34 derives the latest status information for all types of status based on all the combination information 103 to 108 included in the status memory 38. In the case of this example, the ink status information "C90, M90, Y90, K100", the cover status information "cover open", the paper status information "A4, Hagaki", and the duplex printing status information "both side" is derived. Next, the controller 34 determines whether the status information for all types of status created in S62 and the status information for all types of status created in S64 are identical (S66). In the case of the above example, the cover status information is "cover close" in the status information created in S62, and the cover status information is "cover open" in the status information created in S64. In this case, 'NO' is determined of S66. In this case, the controller 34 sends the difference in status information between the status information for all types of status created in S62 and the status information for all types of status created in S64 (the status information for all types of status created in S64 having priority) to the PC 50 (S68). In the case of the above example, the cover status information "cover open" is sent to the PC 50. Here, other types of status information are not sent. Moreover, the status number of the latest difference combination information ("5008" in the example of FIG. 3) is also sent to the PC 50 in S68. By contrast, in the case of YES in S66, the controller 34 sends the status number of the latest difference combination information ("5008" in the example of FIG. 3) to the PC 50 (S70). Here, the status information is not sent.

According to the aforementioned embodiment, the stored contents of the status memory 38 are updated each time the status of the printer 10 changes. The stored contents of the status memory 38 are not updated unless any change in the status of the printer 10 occurs. The status memory 38 is capable of storing six items of combination information accumulated in the order of occurrence or the progress of time. Except for the one item of all types combination information, the status memory 38 stores items of difference combination information that merely includes the status information that indicates the status after the change, of the type in which the change had took place. As a result, the stored contents of the status memory 38 are reduced.

The PC 50 stores the latest status number that had been received in the past. The PC 50 sends this status number to the printer 10 (S12 of FIG. 6). In this case, the printer 10 determines whether the received status number and the status number included in the latest difference combination information are identical (S50 of FIG. 8). In a case where the received status number and the status number included in the latest difference combination information are not identical, the printer 10 sends the latest combination information (the status information for all types of status or a lesser number of types of status information) to the PC 50 (S58, S68 of FIG. 8). The PC 50 is capable of obtaining the latest status information, and is capable of displaying the latest status information. The user can thus learn the latest status information of the printer 10. Further, even though the case is of the received status number and the status number included in the latest difference combination information not being identical, but the status information currently being stored in the PC 50 is identical to the latest status information of the printer 10, the status information is not sent from the printer 10 to the PC 50 (only the latest status number is sent: S70 of FIG. 8). It is consequently possible to reduce the communication load on the network between the printer 10 and the PC 50.

If the status number is sent from the PC 50 to the printer 10 in a state where the status memory 38 of the printer 10 has not been updated, it is determined in the printer 10 whether the received status number and the status number included in the latest difference combination information are identical. In this case, only the "OK" response is sent to the PC 50, and the status number and the status information are prohibited from being sent to the PC 50. As a result, unnecessary status information is not sent from the printer 10 to the PC 50. When the printer system 2 of the present embodiment is utilized, the phenomenon does not occur in which unnecessary status information is sent from the printer 10 to the PC 50. It is consequently possible to reduce the communication load on the network between the printer 10 and the PC 50.

Variants of the above embodiment are given below.

(1) The status memory 38 may store only one item of latest combination information (including all types of status information). In this case, 'NO' is determined of S50 of FIG. 8, and the printer 10 sends the latest combination information that is being stored in the status memory 38 to the PC 50. In this case, the process from S54 onwards of FIG. 8 will not be executed. Moreover, in this case, the PC 50 need not continually store the status information (and may store only the status number).

(2) Each of the items of combination information stored in the status memory 38 may include all the types of status information. For example, in the case of the example of FIG. 2, the combination information 103 may include not only the ink status information, but also the other three types of status information (these can be obtained from the combination information 102).

(3) In the above embodiment, the printer 10 updates be stored contents of the status memory 38 using a change in status as its trigger. However, the printer 10 may update the stored contents of the status memory 38 using a different condition as the trigger. For example, the stored contents of the status memory 38 may be updated each time a predetermined time period has passed. In this case, the printer 10 may be configured not to update the stored contents of the status memory 38 in a case where there has been no change in status since the previous update.

(4) In the above embodiment, the ink status information, the cover status information, the paper status information, and the duplex printing status information were adopted as the status information of the printer 10. However, other status information may be adopted. For example, status information concerning the number of sheets printed, status information concerning whether there is a paper jam, status information concerning the number of times maintenance has been performed, etc. may be adopted. Further, for example, status information may be adopted showing which PC the printer 10 is the default printer for. Various other items may be adopted as the status information.

(5) In the above embodiment, the printer system 2 is a structure to present the status of the printer 10 to the user of the PC 50. However, the technique of the above embodiment may also be adopted in a management system in which a management device (PC) manages the status of a plurality of printers 10. For example, for each of the plurality of printers, the management device stores an association of ID specifying the printer (for example, a MAC address) and a status number. Each time a predetermined period has passed, the management device sends the status numbers to their associated printers. The management device can thus obtain the latest status of each of the printers.

(6) The status number of the combination information may be determined randomly (it being preferred that the same numbers are not utilized). If the printer 10 is able to specify the storage sequence of the combination information (for example, if the printer 10 can specify the storage sequence by the sequence in which the combination information is listed), this method may be adopted. Further, another format of identification information other than the status number (for example, letters of the alphabet, etc.) may be utilized.

Some of the technique taught in the above embodiment is set forth below.

As described above, the timing at which the second updating device updates the stored contents of the second storage device is not particularly restricted in the aforementioned communication system. The timing at which updating is performed may be set as follows. In the case where a status of the second communication device has changed, the status information obtaining device may obtain status information following the change. In this case, the second updating device may update the stored contents of the second storage device in a case where the status information obtaining device has obtained the status information following the change. According to this configuration, the update of the stored contents of the second storage device is triggered by the change in status of the second communication device. That is, the stored contents of the second storage device are not updated while there is no change in the status of the second communication device. It should be noted that the "status information following the change" may be termed status information that indicates the change that had taken place. In this sense, the "status information following the change" may be termed information obtained at any timing that directly follows the time at which the change occurred.

The status information obtaining device may obtain status information for only one type of status. Alternatively, the status information obtaining device may obtain status information for each of a plurality of types of status. In this case, the second storage device may cumulatively store the plurality of items of combination information including the status information for all types of status and identification information. Alternatively, in order to reduce the amount of memory utilized, the following configuration may be adopted.

The second storage device may store all types combination information that includes all types of status information and the identification information, and may store difference combination information that includes one type of status information and identification information. In this case, in the case where the status information obtaining device obtains the status information following the change with respect to any one of the plurality of types of status, the second updating device may store difference combination information including the status information following the change and new identification information in the second storage device. For example, assume that the status information obtaining device obtains the status information for each of type "T1" and type "T2". In this case, the second storage device stores all types combination information that includes status information ST1 of type "T1", status information ST2 of type "T2", and identification information (for example, "006"). In a case where, from this state, the status information ST1 of type "T1" has changed to ST1', the second storage device stores difference combination information that includes the status information ST1' of type "T1" and identification information (for example, "007"). When the difference combination information is stored in this manner, the status information for all types of status is not included in each of the plurality of items of all types combination information. As a result, it is possible to reduce the amount of memory utilized. Moreover, in the case of a configuration where one item of all types combination information and a plurality of items of difference combination information are stored in the second storage device, the stored contents of the second storage device may be updated adopting the following technique.

In the case where the status information obtaining device obtains the status information following the change with respect to any one of the plurality of types of status, the second updating device may execute the following processes.

(1) Create, based on the all types combination information and the oldest difference combination information stored in the second storage device, new all types combination information including all types of status information and identification information included in the oldest difference combination information.

(2) Delete the all types combination information and the oldest difference combination information that has been stored in the second storage device.

(3) Store the new all types combination information in the second storage device.

(4) Store new difference combination information including the status information of the status following the change and new identification information in the second storage device.

It is thus possible to store, in the second storage device, a plurality of items of combination information corresponding to the latest changes in status. Furthermore, the above numbers (1) to (4) do not mean the order of the processes.

In the case of a configuration where a plurality of items of difference combination information is stored in the second storage device, the determination device may determine whether the received identification information is identical to identification information included in the latest difference combination information stored in the second storage device. In this case, in a case where the determination device determines that the received identification information is not identical to the identification information included in the latest difference combination information, the second communication device may specify the latest status information for all types of status from the stored contents of the second storage device, and may send combination information including the specified status information and the identification information included in the latest difference combination information to the first communication device. That is, the status information for all types of status may be sent to the first communication device each time.

Alternatively, the following configuration may be adopted. In a case where the determination device determines that the received identification information is not identical to the identification information included in the latest difference combination information, the second communication device may further comprise a specifying device that specifies status information following a change with respect to a type of status which has changed in a period from a time at which difference combination information including the received identification information was stored in the second storage device to a time at which the latest difference combination information was stored in the second storage device. In a case where the determination device determines that the received identification information is not identical to the identification information included in the latest difference combination information, the second communication device may send combination information including the status information specified by the specifying device and the identification information included in the latest difference combination information to the first communication device. According to this configuration, only the difference between the latest status information that was obtained by the first communication device in the past and the latest status information of the second communication device is sent to the first communication device. As a result it is possible to reduce the amount of information sent from the second communication device to the first communication device. It is thus possible to further reduce the load on the network between the first communication device and the second communication device.

The second communication device may be configured as follows. The second communication device may have the following status determination device instead of the determination device described above. The status determination device determines whether status information combined with the identification information received by the second receiving device is identical to the status information included in the latest combination information stored in the second storage device. In this case, a second sending device may send the latest combination information to the first communication device in a case where the status determination device determines that the status information combined with the received identification information is not identical to the status information included in the latest combination information. Further, a sending controlling device may prohibit the second sending device from sending combination information to the first communication device in a case where the status determination device determines that the status information combined with the received identification information is identical to the status information included in the latest combination information. According to this communication system, it is possible to reduce the occurrence, compared to the conventional case, of unnecessary status information being sent.

The aforementioned communication system may be configured as follows. The second communication device may further comprise an identification information determination device that determines whether the identification information received by the second receiving device is identical to identification information included in the latest combination information stored in the second storage device. In a case where the identification information determination device determines that the received identification information is not identical to the identification information included in the latest combination information, and the status determination device determines that the status information combined with the received identification information is identical to the status information included in the latest combination information, the second sending device may send the identification information included in the latest combination information to the first communication device and may not send the status information included in the latest combination information to the first communication device. In this case, the first receiving device may receive the identification information sent from the second communication device. The first updating device may update the stored contents of the first storage device such that the identification information received by the first receiving device is stored in the first storage device. According to this configuration, the first communication device is capable of storing the latest identification information. Moreover, unnecessary status information is not communicated.

The elements of the first communication device also have utility. A computer readable medium that stores a computer program to realize a communication device that functions as the first communication device also has utility. Further, the elements of the second communication device also have utility. A computer readable medium that stores a computer program to realize a communication device that functions as the second communication device also has utility.

The first storage device of the first communication device may store the identification information and the status information. The first updating device of the first communication device may update the stored contents of the first storage device such that identification information and status information included in the combination information received by the first receiving device are stored in the first communication device.

The second storage device of the second communication device may store a plurality of items of combination information. The second storage device may store a plurality of items of all types combination information, or may store one item of all types combination information and a plurality of items of difference combination information. In this case, in the case where the determination device has determined that the received identification information is not identical to the identification information included in the latest combination information, the second communication device may specify status information following a change with respect to a type of status which has changed in a period from a time at which combination information including the received identification information was stored in the second storage device to a time at which the latest combination information was stored in the second storage device, and may send combination information including the specified status information and the identification information included in the latest combination information to the first communication device. "Specifying" may be executed in the manner described below. The second communication device may (1) specify all the types of status information at the time when the combination information including the received identification information is stored in the second storage device, (2) specify all the types of status information at the time when the latest combination information is stored in the second storage device, or (3) specify the difference between all the types of status information specified in (1) and all the types of status information specified in (2).

The second communication device may be a printer. The term "printer" refers to a device having at least a printing function, and does not exclude a device that also has other functions (e.g. a multi-function device).

The status information of the second communication device may include information concerning the amount of consumable supplies utilized in printing (for example, ink or toner). The status information may include information concerning the size of the paper utilized in printing. The status information may include information concerning the state of a cover member (open state and close state) with respect to the casing of the printer.

What is claimed is:

1. A communication system comprising:
   a first communication device; and
   a second communication device configured to be connected with the first communication device in a communicable manner,
   wherein the first communication device comprises:
   a first storage device configured to store identification information;
   a first processor; and
   first memory storing computer-executable instructions that, when executed by the first processor, cause the first communication device to:
   send the identification information stored in the first storage device to the second communication device;
   receive combination information sent from the second communication device;
   output status information included in the received combination information; and
   update stored contents of the first storage device such that identification information included in the received combination information is stored in the first storage device,
   wherein the second communication device comprises:

a second storage device configured to store a plurality of items of combination information, each item of combination information including status information and identification information;

a second processor; and second memory storing computer-executable instructions that, when executed by the second processor, cause the second communication device to:

obtain status information concerning each of a plurality of types of status of the second communication device;

update the stored contents of the second storage device such that the latest combination information, including the latest obtained status information and new identification information, is stored in the second storage device;

receive the identification information sent from the first communication device;

determine whether the received identification information is identical to the latest identification information included in the latest combination information stored in the second storage device;

send difference combination information to the first communication device in a case where the received identification information is not identical to the latest identification information, the difference combination information including the latest identification information and difference status information, the difference status information being a difference between status information concerning the plurality of types of status corresponding to the received identification information and status information concerning the plurality of types of status corresponding to the latest identification information; and refrain from sending combination information to the first communication device in a case where the received identification information is identical to the latest identification information.

2. The communication system as in claim 1, wherein in a case where any one of the plurality of types of status of the second communication device changes, the second communication device obtains status information following the change and updates the stored contents of the second storage device.

3. The communication system as in claim 2, wherein the second storage device is configured to store all-types combination information and one-type combination information, the all types combination information includes all types of status information concerning all of the plurality of types of status and identification information, the one-type combination information includes one type of status information concerning one of the plurality of types of status and identification information, and in a case where the second communication device obtains the status information following the change concerning any one of the plurality of types of status, the second communication device stores one-type combination information including the status information following the change and new identification information in the second storage device.

4. The communication system as in claim 3, wherein the second storage device is configured to store one item of all-types combination information and a plurality of items of one-type combination information, and in a case where the second communication device obtains the status information following the change concerning any one of the plurality of types of status, the second communication device:

(1) creates, based on the all-types combination information and the oldest one-type combination information stored in the second storage device, new all-types combination information including all types of status information and identification information included in the oldest one-type combination information, (2) deletes the all-types combination information and the oldest one-type combination information from the second storage device, (3) stores the new all types all types combination information in the second storage device, and (4) stores new one-type combination information including the status information following the change and new identification information in the second storage device.

5. The communication system as in claim 4, wherein the second memory stores additional computer-executable instructions that, when executed by the second processor, further cause the second communication device to:

in a case where the received identification information is not identical to the latest identification information, (1) specify the difference status information concerning a type of status which has changed in a period from a time at which one-type combination information including the received identification information was stored in the second storage device to a time at which the latest one-type combination information was stored in the second storage device, and (2) send the difference combination information including the specified difference status information and the latest identification information to the first communication device.

6. The communication system as in claim 1, wherein the second memory stores computer-executable instructions that, when executed by the second processor, further cause the second communication device to:

send the difference combination information to the first communication device in a case where the received identification information is not identical to the latest identification information although the received identification information is stored in the second storage device, and send combination information including the latest identification information and the status information concerning the plurality of types of status corresponding to the latest identification information in a case where the received identification information is not identical to the latest identification information due to the received identification information not being stored in the second storage device.

7. A communication system comprising:

a first communication device; and a second communication device configured to be connected with the first communication device in a communicable manner, wherein the first communication device comprises:

a first storage device configured to store identification information;

a first processor; and first memory storing computer-executable instructions that, when executed by the first processor, cause the first communication device to:

send the identification information stored in the first storage device to the second communication device;

receive combination information sent from the second communication device;

output status information included in the received combination information; and
update stored contents of the first storage device such that identification information included in the received combination information is stored in the first storage device, wherein the second communication device comprises:

a second storage device configured to store a plurality of items of combination information, each item of combination information including status information and identification information;

a second processor; and second memory storing computer-executable instructions that, when executed by the second processor, cause the second communication device to:

obtain status information concerning each of a plurality of types of status of the second communication device;

update stored contents of the second storage device such that the latest combination information, including the latest obtained status information and new identification information, is stored in the second storage device;

receive the identification information sent from the first communication device;

determine whether first status information concerning the plurality of types of status corresponding to the received identification information is identical to second status information concerning the plurality of types of status corresponding to the latest identification information included in the latest combination information stored in the second storage device;

send difference combination information to the first communication device in a case where the first status information is not identical to the second status information, the difference combination information including the latest identification information and difference status information, the difference status information being a difference between the first status information and the second status information; and refrain from sending combination information to the first communication device in a case where the first status information is identical to the second status information.

8. The communication system as in claim 7, wherein the second memory stores additional computer-executable instructions that, when executed by the second processor, further cause the second communication device to:

determine whether the received identification information is identical to the latest identification information, in a case where the received identification information is not identical to the latest identification information, and the first status information is identical to the second status information, send the latest identification information to the first communication device and does not send the status information.

9. The communication system as in claim 7, wherein the second memory stores computer-executable instructions that, when executed by the second processor, further cause the second communication device to:

send the difference combination information to the first communication device in a case where the first status information is not identical to the second status information although the received identification information is stored in the second storage device, and send combination information including the latest identification information and the second status information in a case where the first status information is not identical to the second status information due to the received identification information not being stored in the second storage device.

10. A communication device configured to be connected with another communication device in a communicable manner, the communication device comprising:

a storage device configured to store a plurality of items of combination information, each item of combination information including status information and identification information;

a processor; and memory storing computer-executable instructions that, when executed by the processor, cause the communication device to:

obtain status information concerning each of a plurality of types of status of the communication device itself;

update the stored contents of the storage device such that the latest combination information, including the latest obtained status information and new identification information,. is stored in the storage device;

receive identification information sent from the other communication device;

determine whether the received identification information is identical to the latest identification information included in the latest combination information stored in the storage device;

send difference combination information to the other communication device in a case where the received identification information is not identical to the latest identification information, the difference combination information including the latest identification information and difference status information, the difference status information being a difference between status information concerning the plurality of types of status corresponding to the received identification information and status information concerning the plurality of types of status corresponding to the latest identification information; and refrain from sending combination information to the other communication device in a case where the received identification information is identical to the latest identification information.

11. The communication device as in claim 10, wherein the memory stores computer-executable instructions that, when executed by the processor, further cause the communication device to:

send the difference combination information to the other communication device in a case where the received identification information is not identical to the latest identification information although the received identification information is stored in the storage device, and send combination information including the latest identification information and the status information concerning the plurality of types of status corresponding to the latest identification information in a case where the received identification information is not identical to the latest identification information due to the received identification information not being stored in the storage device.

12. A communication device configured to be connected with another communication device in a communicable manner, the communication device comprising:

a storage device configured to store a plurality of items of combination information, each item of combination information including status information and identification information;

a processor; and memory storing computer-executable instructions that, when executed by the processor, cause the communication device to:
obtain status information concerning each of a plurality of types of status of the communication device itself;
update the stored contents of the storage device such that the latest combination information, including the latest obtained status information and new identification information,. is stored in the storage device;
receive identification information sent from the other communication device;
determine whether first status information concerning the plurality of types of status corresponding to the received identification information is identical to second status information concerning the plurality of types of status corresponding to the latest identification information included in the latest combination information stored in the storage device;
send difference combination information to the other communication device in a case where the first status information is not identical to the second status information, the difference combination information including the latest identification information and difference status information, the difference status information being a difference between the first status information and the second status information; and
refrain from sending combination information to the other communication device in a case where the first status information is identical to the second status information.

13. The communication system as in claim 12, wherein the memory stores computer-executable instructions that, when executed by the processor, further cause the communication device to:
send the difference combination information to the other communication device in a case where the first status information is not identical to the second status information although the received identification information is stored in the storage device, and
send combination information including the latest identification information and the second status information in a case where the first status information is not identical to the second status information due to the received identification information not being stored in the storage device.

14. A communication device system, comprising:
a first communication device;
a second communication device configured to be connected with the first communication device in a communicable manner,
wherein the first communication device comprises:
a first storage device configured to store identification information;
a first processor; and
first memory storing computer-executable instructions that, when executed by the first processor, cause the first communication device to:
send the identification information stored in the first storage device to the second communication device;
receive combination information sent from the second communication device;
output status information included in the received combination information; and
update stored contents of the first storage device such that identification information included in the received combination information is stored in the first storage device, wherein the second communication device comprises:
a second storage device configured to store one item of all-types combination information and a plurality of items of one-type combination information, the all-types combination information including all types of status information concerning all of the plurality of types of status and identification information, the one-type combination information including one-type of status information concerning one of the plurality of types of status and identification information;
a second processor; and
second memory storing computer-executable instructions that, when executed by the second processor, cause the second communication device to:
obtain, in a case where any one of a plurality of types of status of the second communication device changes, status information following the change;
update stored contents of the second storage device, wherein in a case where the status information is obtained following a change, the second communication device (1) creates, based on the all-types combination information and the oldest one-type combination information stored in the second storage device, new all-types combination information including all types of status information and identification information included in the oldest one-type combination information, (2) deletes the all-types combination information and the oldest one-type combination information from the second storage device, (3) stores the new all-types combination information in the second storage device, and (4) stores new one-type combination information including the status information following the change and new identification information in the second storage device;
receive the identification information sent from the first communication device;
determine whether the received identification information is identical to the latest identification information included in the latest combination information stored in the second storage device;
send at least the latest combination information to the first communication device in a case where the received identification information is not identical to the latest identification information; and
refrain from sending combination information to the first communication device in a case where the received identification information is identical to the latest identification information.

15. A communication device configured to be connected with another communication device in a communicable manner, the communication device comprising:
a storage device configured to store one item of all-types combination information and a plurality of items of one-type combination information, the all-types combination information including all types of status information concerning all of the plurality of types of status and identification information, the one-type combination information including one type of status information concerning one of the plurality of types of status and identification information;
a processor; and
memory storing computer-executable instructions that, when executed by the processor, cause the communication device to:

obtain, in a case where any one of a plurality of types of status of the communication device changes, status information following the change;

update stored contents of the storage device, wherein in a case where the status information is obtained following a change, the communication device (1) creates, based on the all-types combination information and the oldest one-type combination information stored in the storage device, new all-types combination information including all types of status information and identification information included in the oldest one-type combination information, (2) deletes the all-types combination information and the oldest one-type combination information from the storage device, (3) stores the new all-types combination information in the storage device, and (4) stores new one-type combination information including the status information following the change and new identification information in the storage device;

receive the identification information sent from the other communication device;

determine whether the received identification information is identical to the latest identification information included in the latest combination information stored in the storage device;

send at least the latest combination information to the other communication device in a case where the received identification information is not identical to the latest identification information; and refrain from sending combination information to the other communication device in a case where the received identification information is identical to the latest identification information.

* * * * *

UNITED STATES PATENT AND TRADEMARK OFFICE
CERTIFICATE OF CORRECTION

PATENT NO. : 8,345,283 B2
APPLICATION NO. : 12/186907
DATED : January 1, 2013
INVENTOR(S) : Kiyotaka Ohara It is certified that error appears in the above-identified patent and that said Letters Patent is hereby corrected as shown below:

In the Claims

In Column 18, Line 14:
Please delete "all types all types" and insert -- all-types --

In Column 20, Line 20:
Please delete "mation,." and insert -- mation, --

Signed and Sealed this
Twenty-fourth Day of December, 2013

Margaret A. Focarino
*Commissioner for Patents of the United States Patent and Trademark Office*